United States Patent [19]
Kiely et al.

[11] Patent Number: 5,655,879
[45] Date of Patent: Aug. 12, 1997

[54] MOUNTING ARRANGEMENT FOR VARIABLE DIAMETER ROTOR BLADE ASSEMBLIES

[75] Inventors: Edmond F. Kiely, Stratford; Robert D. Beatty, Trumbull, both of Conn.

[73] Assignee: Sikorsky Aircraft Corporation, Stratford, Conn.

[21] Appl. No.: 412,035

[22] Filed: Mar. 28, 1995

[51] Int. Cl.⁶ .................................................. B64C 11/28
[52] U.S. Cl. ................................. 416/87; 416/89; 416/226
[58] Field of Search ................................ 416/87, 88, 89, 416/226

[56] References Cited

U.S. PATENT DOCUMENTS

| | | | |
|---|---|---|---|
| 2,163,481 | 6/1939 | Cameron | 244/17 |
| 2,163,482 | 6/1939 | Cameron | 244/17 |
| 3,128,829 | 4/1964 | Young | 170/160.11 |
| 3,713,751 | 1/1973 | Fradenburgh et al. | 416/87 |
| 3,768,923 | 10/1973 | Fradenburgh | 416/89 |
| 3,798,102 | 3/1974 | Penyak | 416/226 |
| 3,814,351 | 6/1974 | Bielawa | 416/87 |
| 3,884,594 | 5/1975 | Fradenburgh | 416/87 |
| 4,007,997 | 2/1977 | Yarm | 416/61 |
| 4,074,952 | 2/1978 | Fradenburgh et al. | 416/87 |
| 4,142,697 | 3/1979 | Fradenburgh | 244/7 |
| 5,253,979 | 10/1993 | Fradenburgh et al. | 416/223 |
| 5,299,912 | 4/1994 | Fradenburgh et al. | 416/87 |

FOREIGN PATENT DOCUMENTS

| | | | |
|---|---|---|---|
| 0063740 | 3/1943 | Denmark | 416/89 A |

Primary Examiner—Edward K. Look
Assistant Examiner—Mark Sgantzos
Attorney, Agent, or Firm—Brian A. Collins

[57] ABSTRACT

A mounting arrangement (100) for a Variable Diameter Rotor blade assembly (16) having an outer blade segment telescopically mounting to a torque tube member (24), and connecting means (70) for transferring centrifugal loads of the outer blade segment (22) to a rotor hub assembly (18). The outer blade segment (22) includes a spar member (30) having a longitudinal axis (26) and defining an internal channel (62) for accepting the torque tube member (24) and the connecting means (70). The mounting arrangement (100) couples the connecting means (70) to the spar member (30) and includes a restraint surface (86) formed within the spar member (30) and a restraint assembly (68) disposed in combination therewith. The restraint surface (86) is disposed inboard of the tip end (90) of the spar member (30) and in a plane oriented transversely of the longitudinal axis (26). The restraint assembly (68) is disposed internally of the spar member (30) and includes a bearing block (102) mounting to the connecting means (70) and having upper and lower transverse slots (104a, 104b) formed therein. The restraint assembly (68) further comprises a load transfer member (106) disposed in combination with the transverse slots (104a, 104b) and the restraint surface (86) for transferring centrifugal loads to the connecting means (70). A sidewall aperture (134) is formed in the spar member (30) and proximal to the restraint surface (86) to facilitate installation of the load transfer member (106) in the transverse slots (104a, 104b).

11 Claims, 4 Drawing Sheets

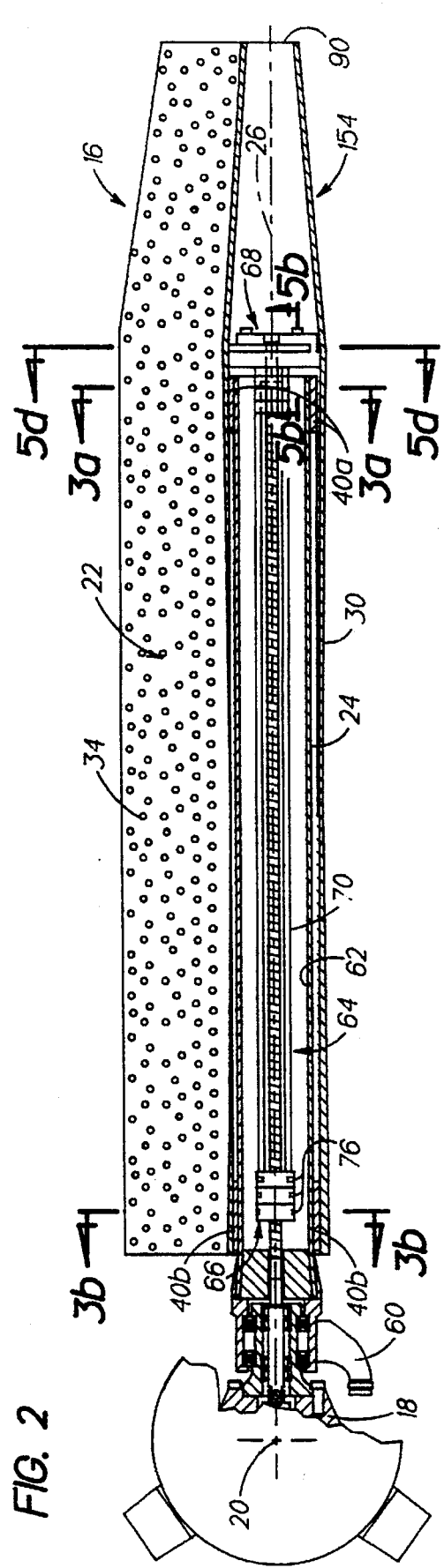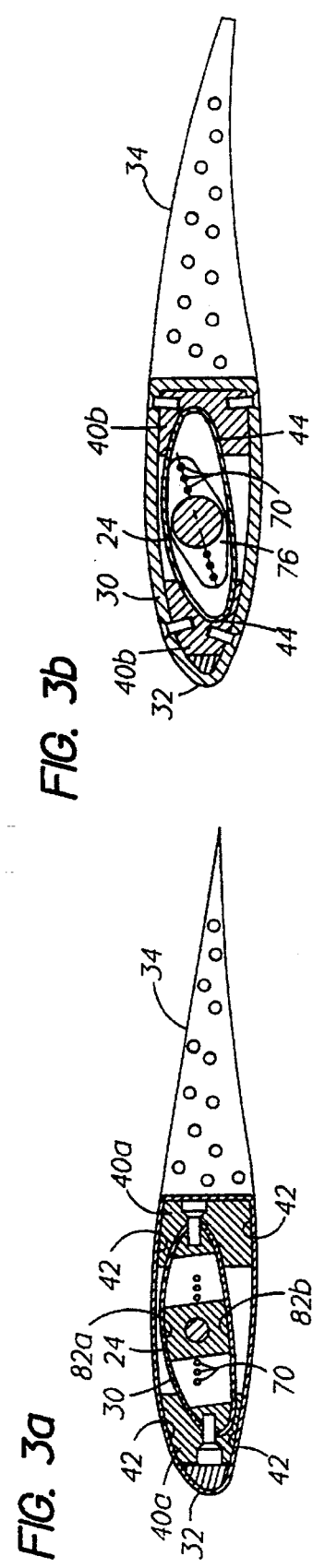
FIG. 2
FIG. 3a
FIG. 3b

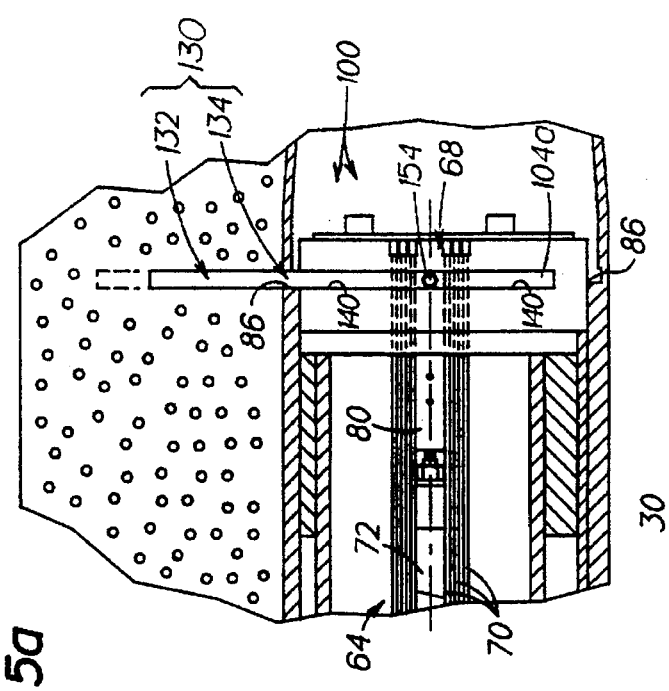
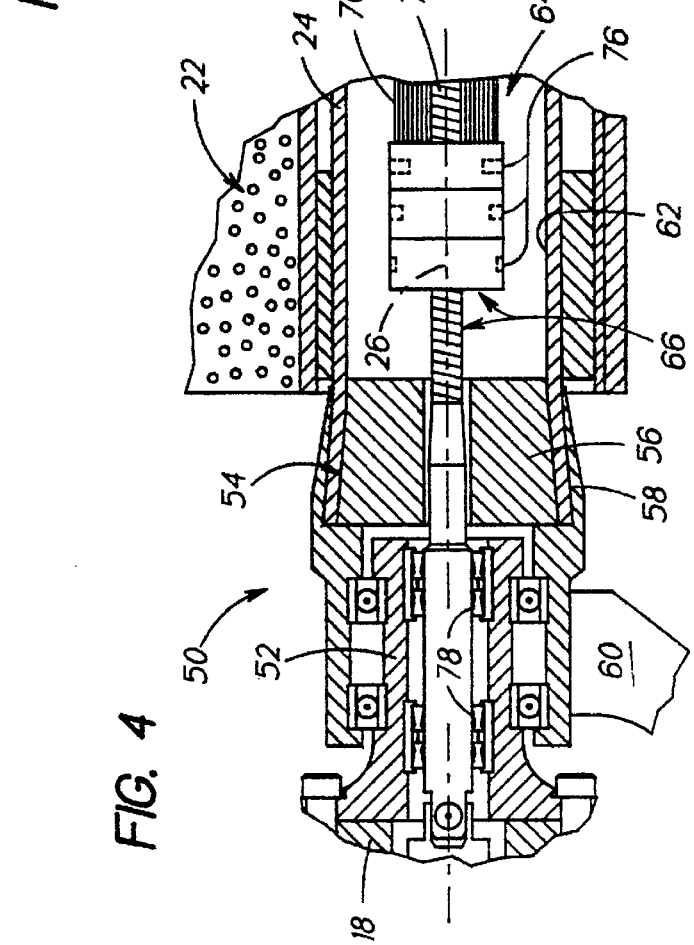

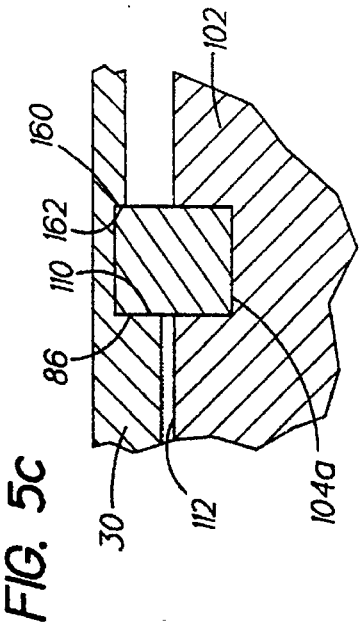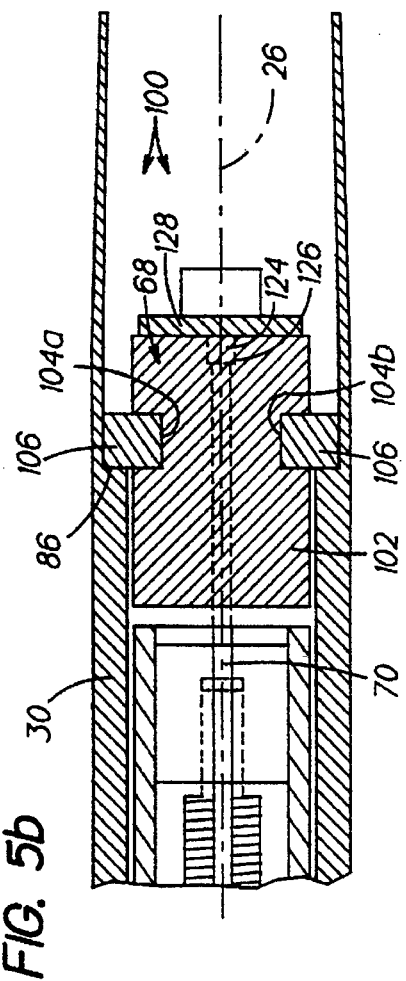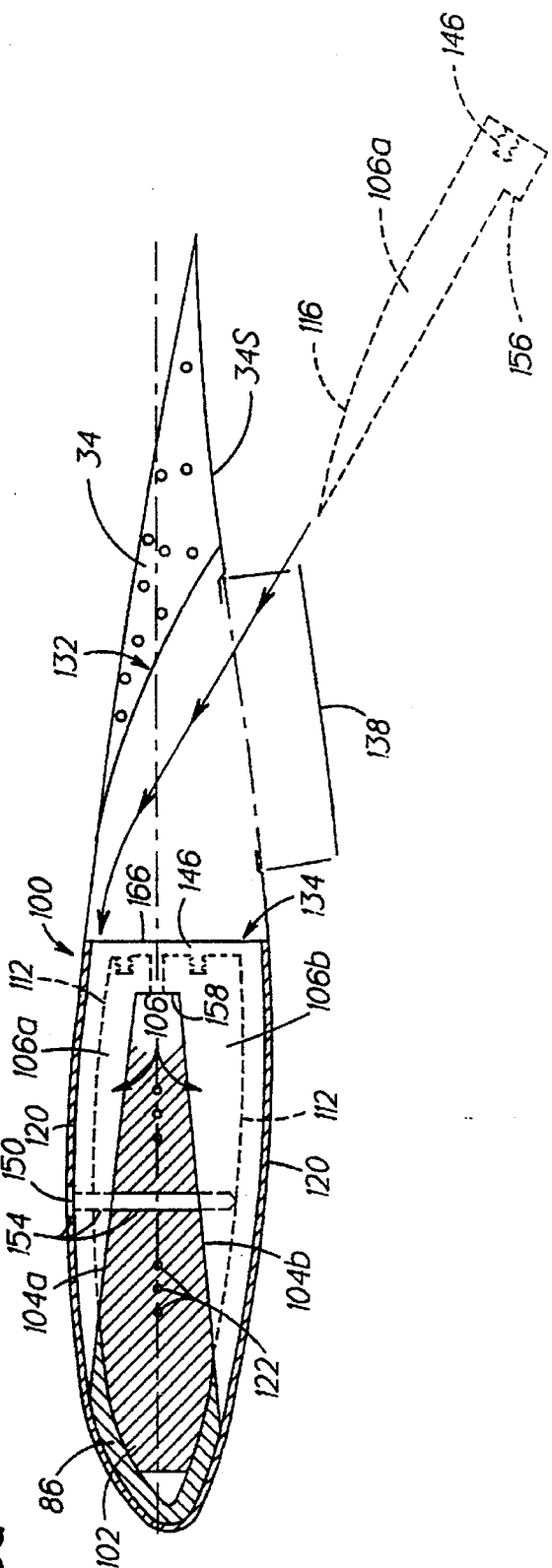

MOUNTING ARRANGEMENT FOR VARIABLE DIAMETER ROTOR BLADE ASSEMBLIES

TECHNICAL FIELD

This invention relates to Variable Diameter Rotor (VDR) blade assemblies for tilt rotor or tilt wing aircraft, and more particularly, to a VDR blade assembly having a telescoping outer blade segment and, more particularly, to a mounting arrangement for retention of the outer blade segment.

BACKGROUND OF THE INVENTION

A tilt rotor or tilt wing aircraft typically employs a pair of rotor systems which are supported at the outermost end of a wing structure and are pivotable such that the rotors thereof may assume a vertical or horizontal orientation. In a horizontal orientation, the aircraft is capable of hovering flight, while in a vertical orientation, the aircraft is propelled in the same manner as conventional propeller-driven fixed-wing aircraft.

Currently, tilt rotor/tilt wing aircraft employ conventional fixed-diameter rotor systems which, in the aerodynamic and aeroelastic design thereof, attempt to blend the competing requirements of hovering and forward flight modes of operation. For example, with regard to hovering flight, it is generally advantageous to employ a large diameter rotor to improve hovering performance by lowering disk loading, reducing noise levels, and reducing downwash velocities. Conversely, a relatively small diameter rotor is desirable in forward flight to improve propulsive efficiency by minimizing blade aero-elastic properties, minimizing blade area, and reducing tip speed (Mach number).

Variable Diameter Rotor (VDR) systems are known to provide distinct advantages over conventional fixed-diameter rotors insofar as such systems are capable of successfully operating in both modes of operation. That is, when the plane of the rotor is oriented horizontally, the rotor diameter is enlarged for improved hovering efficiency and, when oriented vertically, the rotor diameter is reduced for improved propulsive efficiency.

An example of a VDR system and VDR blade assembly therefor is shown in Fradenburgh 3,768,923 wherein each blade assembly includes an outer blade segment which telescopes over a torque tube member so as increase or decrease the rotor diameter. The outer blade segment includes a structural spar, i.e., the foremost structural element which carries the primary loads of the outer blade segment, a leading edge sheath assembly and trailing edge pocket assembly, which sheath and pocket assemblies envelop the spar section to define the requisite aerodynamic blade contour. The torque tube-member mounts to a rotor hub assembly and receives the spar member of the outer blade segment. The torque tube member, furthermore, functions to transfer flapwise and edgewise bending loads to and from the rotor hub while furthermore imparting pitch motion to the outer blade segment. The resultant torque tube/spar assembly forms a central channel for housing a retraction/extension mechanism. The retraction/extension mechanism includes a threaded jackscrew which may be driven in either direction by a bevel gear arrangement disposed internally of the rotor hub assembly. The jackscrew, furthermore, engages a plurality of stacked nuts which are rotationally fixed by the internal geometry of the torque tube member yet are permitted to translate axially along the jackscrew upon rotation thereof. Furthermore, centrifugal straps extend from each nut and are affixed via a retention plate to the tip end of the spar member. As the jackscrew turns, the stacked nuts are caused to translate inwardly or outwardly, thereby effecting axial translation of the outer blade segment. Systems relating to and/or further describing VDR systems are discussed in U.S. Pat. Nos. 3,884,594, 4,074,952, 4,007,997, 5,253, 979, and 5,299,912.

To facilitate mounting of the retraction/extension mechanism to the spar member, prior art variable diameter rotor blade assemblies incorporate a removable tip cap for providing access to the retention plate. While this construction facilitates blade assembly, the resultant stiffness requirements necessary to react the centrifugally-induced compressive buckling loads are maximum at this radial station. This is more readily appreciated by recognizing that the sum of the centrifugal forces of the spar member/outer blade segment culminate at the tip end of the blade assembly. To accommodate the compressive buckling loads, structural augmentation is required at the outermost end portion of the spar member which adversely affects the weight distribution of the blade assembly. That is, the high stiffness and, consequently, weight at the tip end of the blade assembly, requires structural augmentation of the torque tube member to maintain the edgewise frequency design criteria established for the blade assembly. Accordingly, weight penalties are incurred in the torque tube member as a consequence of the additional weight at the tip end of the blade assembly.

Weight penalties at the tip end of the blade assembly can also have adverse effects on the overall weight and complexity of the retraction/extension mechanism. For example, one kilogram (2.2 lbs) of additional mass at the tip end of the outer blade segment produces nearly 6000 N (1,350 lbs) of centrifugal force when the VDR blade assembly is in a fully-extended position. Insofar as centrifugal load is transferred to the rotor hub by the retraction/extension mechanism, the strength and, consequently, weight thereof will increase substantially to react the additional centrifugal load.

In addition to the strength/weight requirements necessary to react the compressive buckling loads, the structural joint required for mounting the removable tip cap compounds the weight-related problems by requiring local strengthening/ stiffening of the associated joined components. Furthermore, due to the high centrifugal field at this radial location, the structural joint is a potential source of fatigue failure. Generally, therefore, tip caps must be designed for low weight/small span to reduce the weight and complexity of the structural joint. Competing with this design requirement is the desirability of incorporating an aerodynamic blade tip which may be tapered, twisted or swept to reduce Mach effects, reduce induced and profile drag losses and increase lift coefficient. As such, a large span blade tip may be desirable to effect a smooth thickness or twist transition.

A need therefore exists for providing a mounting arrangement for retention of the outer blade segment which reduces weight at the outermost end portion of the VDR blade assembly, eliminates the requirement for structural joints, and, facilitates the formation of an aerodynamic blade tip.

SUMMARY OF THE INVENTION

It is an object of the present invention to provide a mounting arrangement for retaining the outer blade segment of a Variable Diameter Rotor (VDR) blade assembly wherein loads are more favorably distributed at the tip end thereof to reduce blade assembly weight.

It is another object of the present invention to provide a mounting arrangement for retaining the outer blade segment of a VDR blade assembly which facilitates the formation of an integral blade tip.

It is an yet another object of the present invention to provide a mounting arrangement for retaining the outer blade segment of a VDR blade assembly which facilitates the formation of an aerodynamic blade tip.

A mounting arrangement is provided for a Variable Diameter Rotor blade assembly having an outer blade segment telescopically mounting to a torque tube member, and connecting means for transferring centrifugal loads of the outer blade segment to a rotor hub assembly. The outer blade segment includes a spar member having a longitudinal axis extending radially outboard of the rotor hub assembly and defining an internal channel for accepting the torque tube member and the connecting means. The mounting arrangement couples the connecting means to the spar member and includes a restraint surface formed within the spar member and a restraint assembly disposed in combination therewith. The restraint surface is disposed inboard of the tip end of the spar member and in a plane oriented transversely of the longitudinal axis. The restraint assembly is disposed internally of the spar member and includes a bearing block mounting to the connecting means and having upper and lower transverse slots formed therein. The restraint assembly further comprises a load transfer member disposed in combination with the transverse slots and the restraint surface for transferring centrifugal loads to the connecting means. A sidewall aperture is formed in the spar member and proximal to the restraint surface to facilitate installation of the load transfer member into the transverse slots.

To facilitate installation and removal of the load transfer member when the outer blade segment is fully assembled, a chordwise channel may be formed in the trailing edge pocket assembly of the outer blade segment and aligned with the sidewall aperture of the spar member. Furthermore, the load transfer member may be bifurcated, i.e., into upper and lower segments to permit independent loading of each segment into the upper and lower transverse slots.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 2 depicts a cross-sectional plan view of a Variable Diameter Rotor (VDR) blade assembly including a torque tube member, an outer blade segment enveloping the torque tube member, a retraction/extension mechanism for effecting telescopic translation thereof, and a mounting arrangement for retaining the outer blade segment;

FIGS. 3a and 3b are cross-sectional views taken substantially along lines 3a—3a and 3b—3b, respectively, of FIG. 2;

FIG. 4 shows an enlarged view of a root end attachment for mounting the VDR blade assembly to a rotor hub assembly;

FIG. 5a shows an enlarged view of the relevant portions of the mounting arrangement including a restraint assembly in combination with a restraint surface formed internally of the outer blade segment and, more particularly, formed internally of the structural spar member thereof;

FIG. 5b is a cross-sectional view of the mounting arrangement taken substantially along line 5b—5b of FIG. 2;

FIG. 5c is an enlarged view of the restraint surface in combination with a load transfer member of the restraint assembly;

FIG. 5d is a cross-sectional view of the mounting arrangement assembly taken substantially along line 5d—5d of FIG. 2.

BEST MODE FOR CARRYING OUT THE INVENTION

Figure 1A:
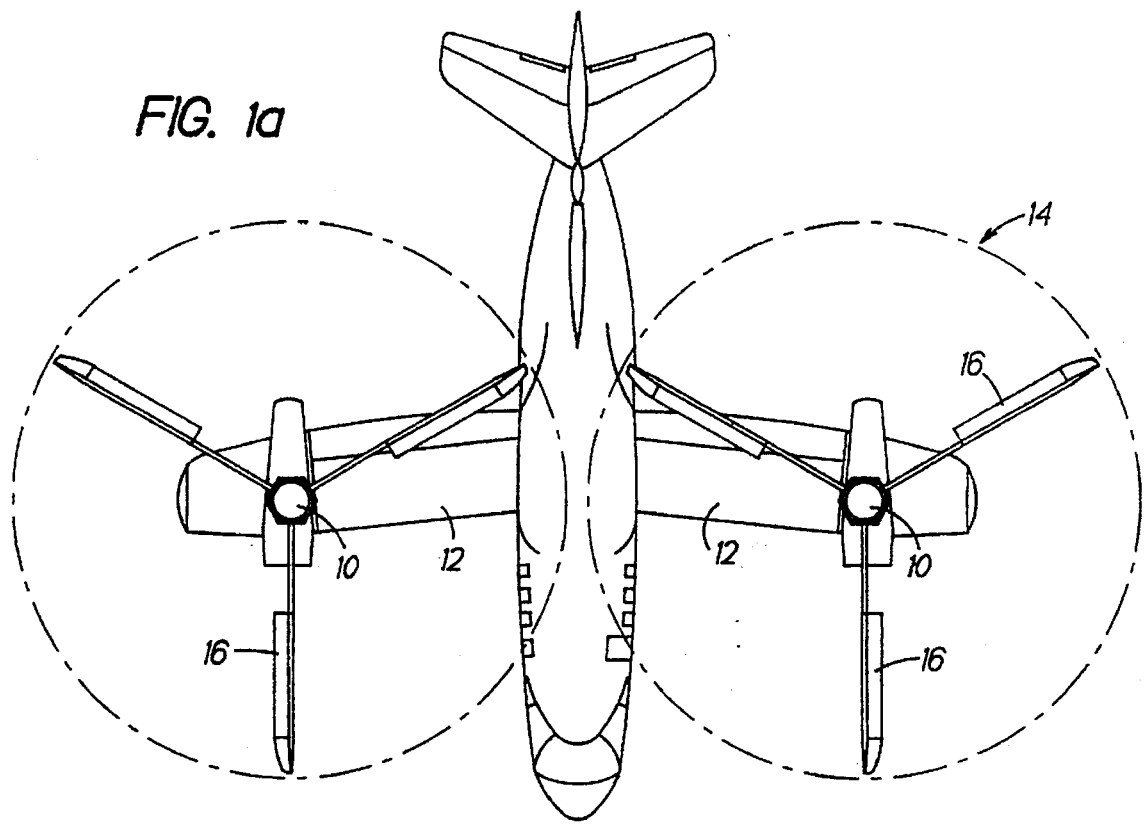
FIGS. 1a and 1b depict a Variable Diameter Rotor aircraft in hovering and forward flight modes of operation, respectively.
Figure 1B:
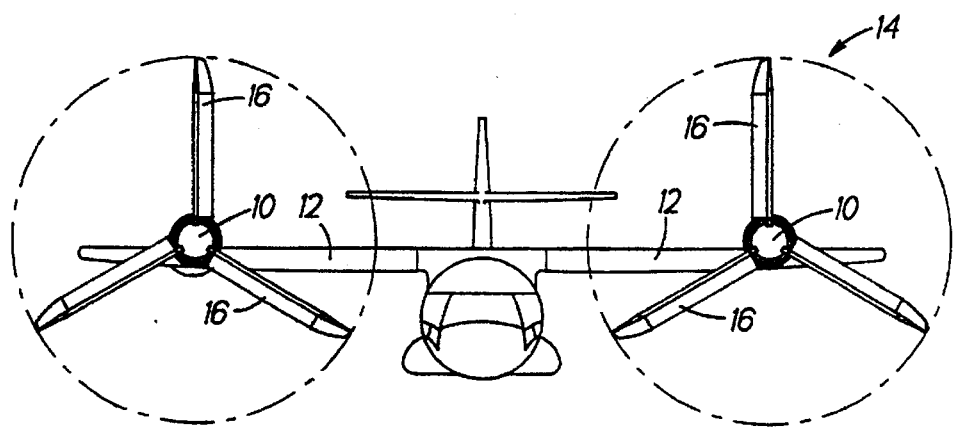

Referring now to the drawings wherein like reference characters identify corresponding or similar elements throughout the several views, FIGS. 1a and 1b show a tilt rotor aircraft having a pair of Variable Diameter Rotor (VDR) systems 10 mounted to laterally extending wing sections 12. The VDR systems 10 are pivotable so that the rotors 14 thereof may assume a horizontal or vertical orientation. Each VDR system 10 includes a plurality of Variable Diameter Rotor (VDR) blade assemblies 16 which are capable of extending or retracting thereby increasing or decreasing the rotor diameter. In FIG. 1a, the VDR blade assemblies 16 are in a fully-extended position for hovering flight, i.e., in a horizontal orientation relative to a ground plane, and, in FIG. 1b, the blade assemblies 16 are fully-retracted for operating in forward flight i.e., in a vertical orientation.

In FIG. 2, a VDR blade assembly 16 is shown in a fully-retracted position. The VDR blade assembly 16 is mounted to and driven by a rotor hub assembly 18 about an axis of rotation 20. The VDR blade assembly 16 includes a movable outer blade segment 22 which telescopes over a torque tube member 24 along a longitudinal axis 26 which projects outwardly of the rotational axis 20. More specifically, the outer blade segment 22 includes a spar member 30 which is enveloped by a leading edge sheath 32 (see FIGS. 3a and 3b) and a foam-filled trailing edge pocket assembly 34 to define the requisite aerodynamic contour of the outer blade segment 22. The spar member 30 is coaxially aligned with and accepts the torque tube member 24 so as to permit telescopic translation thereof relative to the torque tube member 24, and, consequently, permit retraction and extension of the VDR blade assembly 16.

Coaxial alignment of the torque tube and spar members 24, 30 may be effected by any conventional bearing assembly such as a rolling element bearing assembly, however, the preferred bearing assembly includes a first bearing block 40a mounted to the outboard end of the torque tube member 24 and a second bearing block 40b mounted to the inboard end of the spar member 30, and preferably internally thereto. The first bearing block 40a slideably engages an internal pilot surface 42 (FIG. 3a) formed within the spar member 30 and the second bearing block 40b slideably engages an external pilot surface 44 (FIG. 3b) formed about the exterior of the torque tube member 24. The external pilot surface 44 may include wear resistant strips (not shown) along the leading and trailing edges of the torque tube member, however, it should be understood that the external pilot surface 44 may be defined solely by the external surface of the torque tube members 24. To prevent binding or eccentric alignment of the torque tube and spar members 24, 30, it will be appreciated that the pilot surfaces 42, 44 formed on or within the torque tube and spar members 24, 30 must have a substantially constant cross-sectional shape and peripheral dimension, or substantially constant peripheral geometry, along the length of engagement.

In FIGS. 4 and 5a, the root end of the torque tube member 24 is adapted for mounting to a cuff assembly 50 which is journally mounted to a radial arm 52 of the rotor hub assembly 18. The cuff assembly 50 engages a flared root end portion 54 of the torque tube member 24 by means of a correspondingly shaped internal restraint member 56 and an external restraint sleeve 58. The cuff assembly 50, furthermore, includes a pitch control arm 60 through which pitch control inputs are made about the longitudinal axis 26 of the VDR blade assembly.

Telescopic translation of the outer blade segment 22 is effected by means of a retraction/extension mechanism 64 which is disposed internally of the VDR blade assembly 16, and more particularly, disposed within an internal channel 62 defined by the torque tube and spar members 24, 30. In the described embodiment, the retraction/extension 64 mechanism includes a jackscrew assembly 66, a restraint assembly 68, and a plurality of centrifugal straps 70 for coupling the jackscrew and restraint assemblies 66, 68. The restraint assembly 68 cooperates with the spar member 30 to form a mounting arrangement 100 which couples the retraction/extension mechanism 64 to the spar member 30. Before discussing the structural and functional characteristics of the mounting arrangement 100, a brief description of the operation of the retraction/extension mechanism 64 will be described.

The jackscrew assembly 66 is similar to that described in U.S. Pat. No. 3,768,923 and includes a centrally disposed jackscrew 72 having a plurality of threads for engaging a series of stacked nuts 76. The jackscrew 72 is supported at one end by a first journal bearing 78 (FIG. 4) disposed internally of the radial arm 52 and, at the opposing end, to a second journal bearing 80 supported between the upper and lower internal surfaces 82a, 82b (shown in FIG. 3a) of the torque tube member. The jackscrew 72 is, furthermore, driven in either direction by a bevel gear arrangement (not shown) disposed internally of the rotor hub assembly 18. For ease of illustration, the internal gearing mechanisms for driving the threaded jackscrew 72, will not be discussed. Suffice it to say that such mechanisms are known in the art and are described in U.S. Pat. Nos. 4,142,697, 4,009,997, 3,884,594 and 3,713,751. The stacked nuts 76 are rotationally restrained by the internal geometry of the torque tube member 24 (FIG. 3b) yet are permitted to translate axially along the jackscrew 72 upon rotation thereof. The centrifugal straps 70 mechanically interconnect the restraint assembly 68 to the stacked nuts 76 such that as the jackscrew.72 turns, the stacked nuts 76 are caused to translate inwardly or outwardly to effect axial translation of the outer blade segment 22.

FIGS. 5b–5d show the mounting arrangement 100 in greater detail. The spar member 30 is modified to include an internal restraint surface 86 which is disposed inboard of the tip end 90 (FIG. 2) of the spar member 30 and in a plane oriented transversely of the longitudinal axis 26. Preferably, the restraint surface 86 is disposed between radial stations 0.85 and 0.92 when the VDR blade assembly is in a fully-extended position. Radial station is defined as the ratio r/R wherein r is the radial dimension at a point along the longitudinal axis 26 measured from the rotational axis, and R is the fully-extended radial dimension of the VDR blade assembly. Moreover, the restraint surface 86 is formed by a stepped, wall-thickness transition which produces an abrupt stiffness/weight reduction in the tip end 90 of the spar member 30. Co-pending, commonly owned, U.S. patent application Ser. No. 08/412,175 filed Mar. 28, 1995, entitled "Torque Tube/Spar Assembly for Variable Diameter Helicopter Rotors" describes an optimized torque tube/spar assembly wherein the spar member thereof includes an integrally formed restraint surface and is herein incorporated by reference.

The restraint assembly 68 includes a bearing block 102 having upper and lower transverse slots 104a, 104b formed therein for accepting a load transfer member 106. In the described embodiment, the load transfer member 106 is bifurcated (FIG. 5d), i.e.,. forming upper and lower segments 106a and 106b, respectively, to facilitate installation and assembly. Alternatively, a unitary C-shaped load transfer member may be employed, however, the implementation of such unitary component will depend upon the assembly procedure and the available access to the bearing block 102 (discussed hereinafter). The load transfer member 106 includes a first abutment surface 110 (FIG. 5c) which extends beyond the peripheral surface 112 defined by the bearing block (shown in broken lines in FIG. 5d) to engage the restraint surface 86 of the spar member 30. Accordingly, a load path is established from the restraint surface 86 to the bearing block 102 through the load transfer member 106. Preferably, the load transfer member 106 defines an outermost peripheral surface 116 (FIG. 5d) which corresponds in shape to the internal surface geometry 120 of the spar member 30 to maximize the area of engagement with the restraint surface 86. Consequently, shear stresses in the load transfer member 106 are minimized.

Each centrifugal strap 70 passes through an aperture 122 formed in a medial portion of the bearing block 102 and includes a head portion 124 which is disposed in combination with a countersink 126 formed in the radially outer end of the bearing block 102. An end plate 128 is mounted to the bearing block 102 to enclose and capture the head portions 124 of the centrifugal straps 70. While the described embodiment shows a plurality of centrifugal straps 70 to mechanically interconnect the bearing block 102 to the jackscrew assembly, it will be appreciated that a unitary strap or other connecting means may be used for transferring loads and motions therebetween.

In FIGS. 5a and 5d, a passageway 130 is formed in the outer blade segment to provide access to the bearing block 102 thereby facilitating installation and removal of the load transfer member 106. More specifically, a chordwise channel 132 is formed in the pocket assembly 34 and is aligned with a sidewall aperture 134 formed in the aft end of the spar member 30. Access to the channel 132 is provided along the underside of the pocket assembly 34, i.e., through the lower skin 34s thereof, by means of an access panel 138 which is removably detachable therefrom. During assembly, and subsequent to attachment of the centrifugal straps 70, the bearing block 102 is inserted in the root end of the spar member 30 and translocated therefrom so as to align an edge 140 of the transverse slots 104a, 104b with the restraint surface 86. Once the slot edges 140 are aligned with the restraint surface 86, the upper and lower segments 106a and 106b of the load transfer member 106 are passed through the chordwise channel 132 and sidewall aperture 134 and received by the transverse slots 104a, 104b. The channel and sidewall aperture 132, 134 are suitably sized and positioned along the longitudinal axis, i.e., proximal to the restraint surface 86, to facilitate installation of the load transfer member 106. Any suitable technique may be employed for insertion and/or removal of the load transfer member 106, however, in the described embodiment, a small diameter threaded rod (not shown) threadably engages a threaded aperture 146 formed in the aft end of each segment 106a, 106b to facilitate insertion and/or removal thereof.

Once installed, a fastener 150 is disposed through aligned apertures 154 formed in the spar member 30, the bearing block 102 and the load transfer member 106 to integrate the restraint assembly 68, i.e., for maintaining the chordwise position of the load transfer member 106 relative to the bearing block 102. To facilitate chordwise alignment of the upper and lower segments 106a, 106b within the transverse slots 104a, 104b, each segment 106a, 106b may include abutment surfaces 156 for contacting an edge 158 of the bearing block 102. To effect radial alignment of the bearing block 102 and positively lock the load transfer member 106, an alignment surface 160 (FIG. 5c) may be formed in the spar member to engage a second abutment surface 162 of the load transfer member 106. It will be appreciated, however, that the fastener 150 and alignment apertures 154 for unifying the restraint assembly 68, or other suitable alignment means may be employed for effecting radial alignment.

The mounting arrangement 100 of the present invention couples the spar member 30 to the internal retraction/extension mechanism 64 so as to retain the position of the outer blade segment 22 relative to the torque tube member 24 and transfer centrifugal loads of the outer blade segment 22 to the rotor hub assembly 18. More specifically, centrifugal load of the outer blade segment 22 is transmitted through the load transfer member 106 to the bearing block 102 and, finally to the rotor hub assembly 18 through the centrifugal straps 70 and jackscrew assembly 66.

To reduce blade assembly weight, the mounting arrangement 100 couples the retraction/extension mechanism 64 to the spar member 30 at a radially inboard position relative to the tip end 90 of spar member 30. Such mounting arrangement 100 effects a more efficient loading/weight distribution and facilitates the formation of an aerodynamic blade tip. With regard to the former, the mounting arrangement 100 loads the spar member 30 in compression radially inboard of the restraint surface 86 and in tension radially outboard thereof. As such, the mounting arrangement 100 effects a more efficient loading distribution by reducing the compressive buckling loads, i.e., a function of radial station, and by utilizing the tensile strength of the spar member 30 to react centrifugal loads outboard of the restraint surface 86. This load distribution effects a more favorable weight distribution by reducing peak compressive loads in the spar member 30 and reducing the structural requirements in the tip end 90 thereof. That is, the load distribution has the effect of shifting the center of mass/weight of the outer blade segment 22 inwardly, thereby reducing weight at the tip end 90. As discussed in the "Background of the Invention", this weight distribution reduces the stiffness/weight requirements of the torque tube member 24 and the retraction/extension mechanism 64.

Regarding the latter, the mounting arrangement 100 provides an opportunity to form an aerodynamic blade tip 90 wherein the spar member is integrally formed therewith. In FIG. 2, the tip end 90 of the spar member 30 and outer blade segment 22 are shown to include both chordwise per and a rearwardly swept leading edge to minimize induced and profile drag losses. Whereas the prior art VDR blade assemblies require access to the retention plate at the tip end of the spar member, the mounting arrangement 100 of the present invention provides a sidewall aperture 134 for access to and assemblage of the restraint assembly 68. Accordingly, the spar member 30 may extend beyond the mounting arrangement 100 and assume the appropriate geometric shape to form an aerodynamic blade tip 90. Examples of aerodynamic blade tips are shown and described in Jepson U.S. Pat. No. 3,822,105 and Fradenburgh el. al U.S. Pat. No. 4,324, 530. Furthermore, it will be apparent that the integral spar/blade tip eliminates the requirement for structural joints and the attendant weight and design complexities associated therewith.

In the described embodiment, the restraint surface 86 is formed along the entire internal peripheral surface of the spar member 30. It should be understood, however, that the restraint surface 86 is formed at least along the upper and lower internal surfaces thereof to effect engagement with the upper and lower segments 106a, 106b of the load transfer member 106. The described embodiment also discloses the use of a fastener 150 for integrating the load transfer member 106 in combination with the bearing block 102. It will be appreciated that any means for integrating the restraint assembly 68 may be used while remaining within the spirit and scope of the invention. For example, a plug member (not shown) may be installed within the void created by the chordwise channel 132 and sidewall aperture 134 to engage an aft surface 166 of the load transfer member 106 thereby fixing the chordwise position thereof relative to the bearing block 102.

While the preferred embodiment discloses the use of a chordwise channel 132 in combination with a sidewall aperture 134 for providing access to and assembling the restraint assembly 68, it will be appreciated that the trailing edge pocket assembly 34 or a portion thereof may be bonded or otherwise affixed to the spar member 30 subsequent to the assembly and integration of the restraint assembly 68. Accordingly, only the sidewall aperture 134 is required when employing this assembly sequence. Furthermore, such assembly may eliminate the requirement to segment the load transfer member 106 insofar as greater access may permit the direct insertion of a unitary C-shaped load transfer member.

Although the invention has been shown and described with respect to exemplary embodiments thereof, it should be understood by those skilled in the art that the foregoing and other changes, omissions and additions may be made therein and thereto, without departing from the spirit and scope of the present invention.

What is claimed is:

1. In a Variable Diameter Rotor blade assembly (16) having an outer blade segment (22) telescopically mounting to a torque tube member (24), and connecting means (70) for retaining said outer blade segment (22) and transferring centrifugal loads thereof to a rotor hub assembly (18), the outer blade segment (22) including a spar member (30) having a tip end (90), a longitudinal axis (26) extending radially outboard of said rotor hub assembly (18), and an internal channel (62) for accepting the connecting means (70), a mounting arrangement (100) for coupling the connecting means (70) to the spar member (30), characterized by:

said spar member (30) having a restraint surface (86), said restraint surface (86) being disposed radially inboard of the tip end (90) of the spar member (30) and in a plane oriented transversely of said longitudinal axis (26), said spar member (30) furthermore having a sidewall aperture (134) proximal to said restraint surface (86);

a bearing block (102) disposed internally of said spar member (30) and having the connecting means (70) mounted thereto, said bearing block (102) furthermore having upper and lower transverse slots (104a, 104b) formed therein; and a load transfer member (106) disposed in combination with said upper and lower transverse slots (104a, 104b) and said restraint surface (86) of said spar member (30), wherein said load transfer member (106) and said bearing block (102) form a restraint assembly (68) for transferring centrifugal load of the outer blade segment (22) to the connecting means (70), and, wherein said sidewall aperture (134) of said spar member (30) permits access to said transverse slots (104a, 104b) to facilitate installation of said load transfer member (106) therein.

2. The mounting arrangement (100) according to claim 1 further comprising means (150, 154) for chordwise positioning of said load transfer member (106) relative to said bearing block (102).

3. The mounting arrangement (100) according to claim 1 further comprising means (160, 162) for radially aligning said restraint assembly (68) within said spar assembly (30).

4. The mounting arrangement (100) according to claim 2 wherein each of said spar member (30), said bearing block (102) and said load transfer member (106) include an aperture (154) and said fixing means (150, 154) includes a fastener (150) disposed in combination with said apertures (154).

5. The mounting arrangement (100) according to claim 1 wherein said load transfer member (106) is bifurcated to form upper and lower segments (106a, 106b).

6. The mounting arrangement (100) according to claim 5 wherein each of said upper and lower segments (106a, 106b) includes an abutment surface (156) for contacting an edge (158) of said bearing block (102).

7. The mounting arrangement (100) according to claim 1 wherein said sidewall aperture (134) is disposed along an aft end of said spar member (30).

8. The mounting arrangement (100) according to claim 7 wherein said outer blade segment (22) includes a leading edge sheath (32) and a trailing edge pocket assembly (34) for enveloping the spar member (30), said trailing edge pocket assembly (34) having a chordwise channel (132) formed therein, and said chordwise channel (132) being aligned with said sidewall aperture (134) of said spar member (30).

9. The mounting arrangement (100) according to claim 1 wherein said restraint surface (86) is formed along upper and lower internal surfaces of said spar member (30).

10. The mounting arrangement (100) according to claim 1 wherein said spar member (30) defines an internal surface geometry (120) and wherein said load transfer member (106) defines a peripheral surface (116) corresponding in shape to said internal surface geometry (120).

11. In a Variable Diameter Rotor blade assembly (16) having an outer blade segment (22) telescopically mounting to a torque tube member (24), and connecting means (70) for retaining said outer blade segment (22) and transferring centrifugal loads thereof to a rotor hub assembly (18), the outer blade segment (22) including a spar member (30) having a tip end (90), a longitudinal axis (26) extending radially outboard of said rotor hub assembly (18), and an internal channel (62) for accepting the connecting means (70), said spar member (30), furthermore, being enveloped by a leading edge sheath (32) and a trailing edge pocket assembly (34), a mounting arrangement (100) is provided for coupling the connecting means (70) to the spar member (30), characterized by:

said spar member (30) having a restraint surface (86), said restraint surface (86) being disposed radially inboard of the tip end (90) of the spar member (30) and in a plane oriented transversely of said longitudinal axis (26), said spar member (30) furthermore having a sidewall aperture (134) disposed along an aft end of said spar member (30) and proximal to said restraint surface (86), said trailing edge pocket assembly (34) having a chordwise channel (132) formed therein, said chordwise channel (132) being aligned with said sidewall aperture (134) of said spar member (30);

a bearing block (102) disposed internally of said spar member (30) and having the connecting means (70) mounted thereto, said bearing block (102) furthermore having upper and lower transverse slots (104a, 104b) formed therein; and, a load transfer member (106) having upper and lower segments (106a, 106b), said upper segment (106a) being disposed in combination with said upper transverse slot (104a) and said lower segment being disposed in combination with said lower transverse slot (104b), said upper and lower segments being, furthermore, disposed in combination with said restraint surface (86) of said spar member (30), wherein said upper and lower segments (106a, 106b) of said load transfer member (106) and said bearing block (102) form a restraint assembly (68) for transferring centrifugal load of the outer blade segment (22) to the connecting means (70), and, wherein said chordwise channel (132) of said trailing edge pocket assembly (34) and sidewall aperture (134) of said spar member (30) permit access to said transverse slots (104a, 104b) to facilitate installation of said upper and lower segments (106a, 106b) of said load transfer member (106) therein.

* * * * *